United States Patent [19]

Rosset et al.

[11] Patent Number: 4,697,067
[45] Date of Patent: Sep. 29, 1987

[54] STEAM-GENERATING DEVICE AND A COOKING OVEN EQUIPPED WITH SAID DEVICE

[75] Inventors: Roger Rosset, Rumilly; Jacques Mayeur, Seynod, both of France

[73] Assignee: SEB S.A., Selongey, France

[21] Appl. No.: 821,002

[22] Filed: Jan. 22, 1986

[30] Foreign Application Priority Data

Jan. 25, 1985 [FR] France ................................. 85 01053

[51] Int. Cl.[4] ........................... F22B 1/28; H05B 3/00
[52] U.S. Cl. ................................... 219/401; 219/273
[58] Field of Search ............... 219/401, 271, 272, 273, 219/274, 275, 276, 362

[56] References Cited

U.S. PATENT DOCUMENTS

| | | | |
|---|---|---|---|
| 1,749,969 | 3/1930 | Brodin | 219/275 |
| 2,668,993 | 2/1954 | Bair | 422/125 |
| 3,080,624 | 3/1963 | Weber | 219/274 |
| 3,379,855 | 4/1968 | Forrester | 219/274 |
| 3,639,725 | 2/1972 | Maniscalco | 219/401 |
| 3,672,568 | 6/1972 | Foote | 236/44 |
| 3,891,826 | 6/1975 | Seuthe | 219/275 |
| 4,419,302 | 12/1983 | Nishino et al. | 261/142 |

FOREIGN PATENT DOCUMENTS 502841  3/1939  United Kingdom ................ 219/401

*Primary Examiner*—E. A. Goldberg
*Assistant Examiner*—Teresa J. Walberg
*Attorney, Agent, or Firm*—Young & Thompson

[57] ABSTRACT

The device for generating steam within a cooking oven includes a heating element (1) and a water reservoir (2). The heating element is placed above the water (3) contained in the reservoir (11). Two sheet-metal members (4, 5) located in closely spaced relation so as to define a capillary space are placed in contact with the heating element (1) and immersed in the water (3) of the reservoir, one of the sheet-metal members being provided with at least one opening (7) placed in proximity to the heating element (1).

3 Claims, 10 Drawing Figures

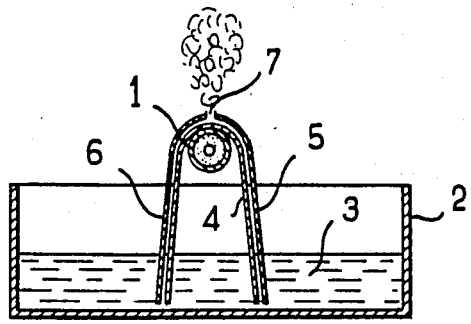
FIG_1
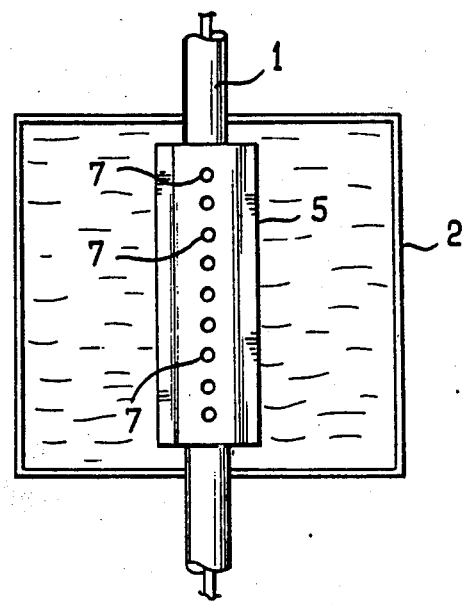
FIG_2

STEAM-GENERATING DEVICE AND A COOKING OVEN EQUIPPED WITH SAID DEVICE

BACKGROUND OF THE INVENTION

1. Field of the Invention

The present invention relates to a steam-generating device which is particularly applicable to an electric oven designed for the purpose of cooking food and equipped with the device under consideration.

2. Description of the Prior Art

It is known that an attractive prospect is offered by the possibility of producing steam within a cooking oven, thus making it possible to achieve enhanced temperature uniformity within the oven, to guard against drying of food being cooked and also to improve heat-exchange processes.

Many different designs have already been proposed for the production of steam within a cooking oven. A device of this type usually comprises a water reservoir placed in contact with the heating resistors which are mounted in a location close to the bottom wall of the oven.

Steam is thus generated by boiling the water or by spraying water onto a plate which has been heated to a high temperature.

The disadvantages of these steam-generating devices lie in the fact that water which has been brought to the boil evaporates very rapidly, with the result that it is necessary to fill the reservoir at frequent intervals and that it is difficult to control the delivery of steam which has formed.

SUMMARY OF THE INVENTION

The aim of the invention is to overcome these drawbacks by means of a device which is distinguished by the fact that the heating element is placed above the water contained in a reservoir, that two sheet-metal members located in closely spaced relation to each other so as to define a capillary space between them are placed in contact with the heating element and dip into the water contained in the reservoir, one of the sheet-metal members being provided with at least one opening placed in proximity to the heating element.

The present Applicant has found, surprisingly, that when the heating element is hot, relatively dry steam escapes through the opening formed in one of the sheet-metal members in proximity to the heating element.

This steam is released without producing ebullition of the water contained in the reservoir since this latter is not in direct contact with the heating element. The only direct contact between said heating element and the water contained in the reservoir is provided by the two immersed sheet-metal members.

The rate of steam delivery can be adjusted by modifying the following parameters : distance between the two sheet-metal members, greater or lesser heat conductivity of said sheet-metal members, distance between the heating element and the water, and heating power of the heating element.

The distance between the two sheet-metal members is usually of the order of a few tenths of a millimeter.

Preferably, the distance between the heating element and the water level, the nature of the sheet-metal members and the dimensions of the capillary space are such that the steam which escapes through the opening formed near the heating element is superheated to a temperature of at least 160° C. The steam thus formed has the effect of considerably accelerating the cooking process.

The invention is also directed to an oven for cooking food and comprising a steam-generating device in accordance with the invention.

According to this aspect of the invention, the oven comprising a tubular electric resistor having two parallel legs at the bottom of the oven is provided with a water reservoir of sheet metal placed between the two legs of the heating resistor. Said reservoir has two flanges which are formed respectively on two opposite side walls of said reservoir and are adapted to cover each of the two parallel legs of the heating resistor. Said water reservoir is closed by a sheet-metal cover having side walls engaged within said reservoir. The side walls of said cover are located in closely spaced relation to the side walls of the reservoir and immersed in the water of the reservoir so as to form a capillary space between said walls. Said capillary space opens to the exterior in the zone located between the two flanges and the adjacent edge of the top wall of the cover.

The steam escapes through the slits defined between the flanges of the reservoir and the adjacent edge of the top wall of the cover.

By virtue of this arrangement, the steam-generating device does not take up any space within the oven itself.

Moreover, the arrangement of the slits for the release of steam along the heating resistors permits excellent distribution of steam within the oven, thus permitting greater uniformity of temperature distribution within the oven and therefore more efficient cooking of food.

BRIEF DESCRIPTION OF THE DRAWINGS

Other features of the invention will be more apparent to those skilled in the art upon consideration of the following description and accompanying drawings, wherein :

FIG. 1 is a sectional view which is perpendicular to the heating element and shows a first embodiment of the device in accordance with the invention;

FIG. 2 is a top view of the device ;

DESCRIPTION OF THE PREFERRED EMBODIMENTS

Figure 3:
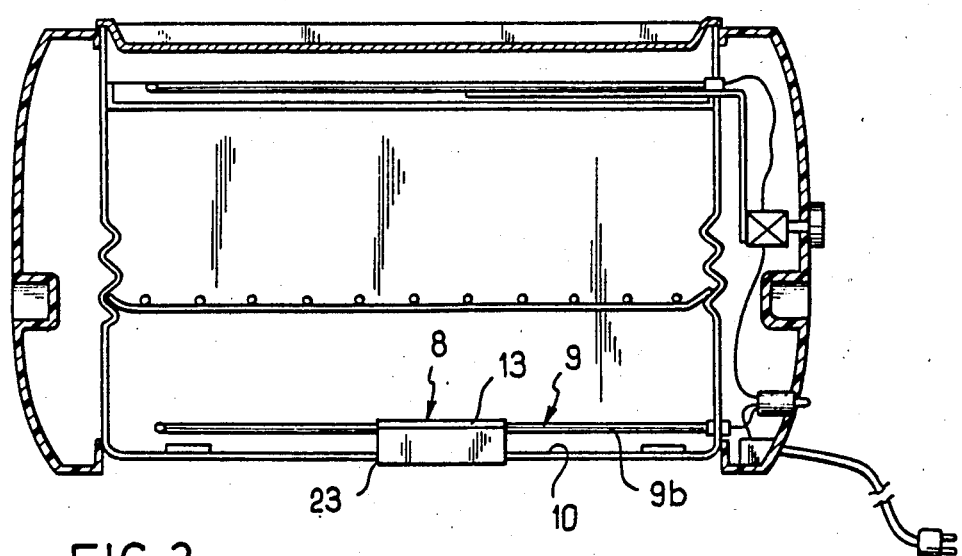
FIG. 3 is a longitudinal sectional view of a cooking oven equipped with a device in accordance with the invention.

In the embodiment of FIGS. 1 and 2, the steam-generating device comprises a heating element 1 consisting of a tubular electric resistor and a reservoir 2 containing the water 3.

The heating element 1 is placed above the water 3 contained in the reservoir 2. Two sheet-metal members 4, 5 located in closely spaced relation to each other in order to define a capillary space 6 between said members are placed in contact with the heating element 1 and immersed in the water 3 of the reservoir 2.

The sheet-metal member 5 is provided with openings 7 which are placed directly above the heating element 1.

The distance between the two sheet-metal members 4, 5 is of the order of a few tenths of a millimeter. By way of example, said sheet-metal members 4, 5 can be of stainless steel.

In the example illustrated in FIGS. 1 and 2, the two sheet-metal members 4, 5 are bent to a U-shaped cross-section and cover the heating element 1 in such a manner as to ensure that the base of the U is in contact with the heating element 1 and that the two arms of the U formed by the two sheet-metal members dip into the water 3 of the reservoir 2. Moreover, the openings 7 are formed in the outer sheet-metal member 5 along a line located above the heating element 1 in a vertical plane which passes through the axis of said element.

The operation of the device under consideration will now be described.

By virtue of the very narrow gap formed between the two sheet-metal members 4, 5, the water 3 tends to rise within said gap under the action of capillarity and thermal pumping.

As soon as the water reaches a zone in which the temperature is equal to the boiling point, the water vaporizes and escapes through the openings 7.

Tests have shown that the distance between the resistor 1 and the water level could attain 60 mm.

The water contained in the reservoir does not come to the boil under any circumstances since the sheet-metal member 4, 5 is of small thickness (less than 1 mm) and does not establish a sufficient thermal contact with the water to produce ebullition.

Figure 4:
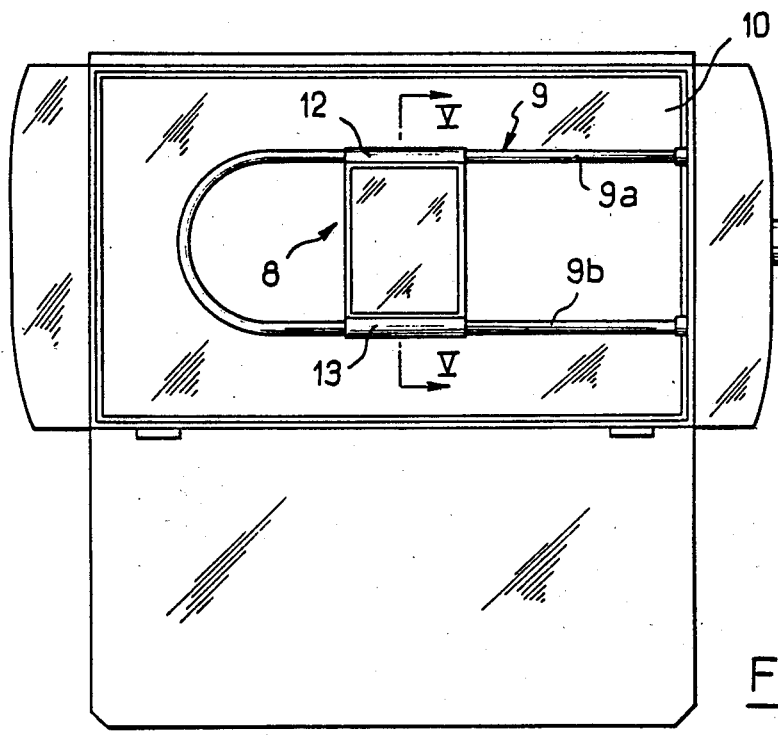
FIG. 4 is a top view of the oven after removal of its upper portion.

In the embodiment of FIGS. 3 and 4, there is shown an electric oven for cooking food, comprising a steam-generating device 8 in accordance with the invention.

Figure 5:
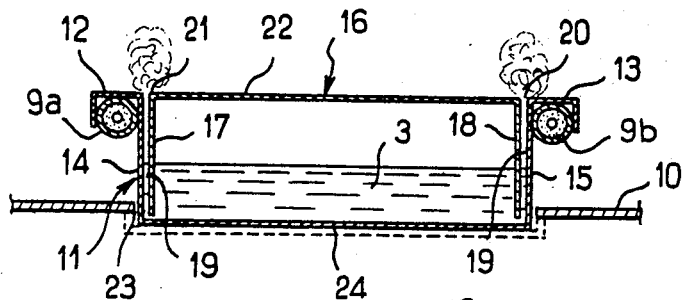
FIG. 5 is a sectional view to a larger scale, this view being taken along the plane V—V of FIG. 4.
Figure 6:
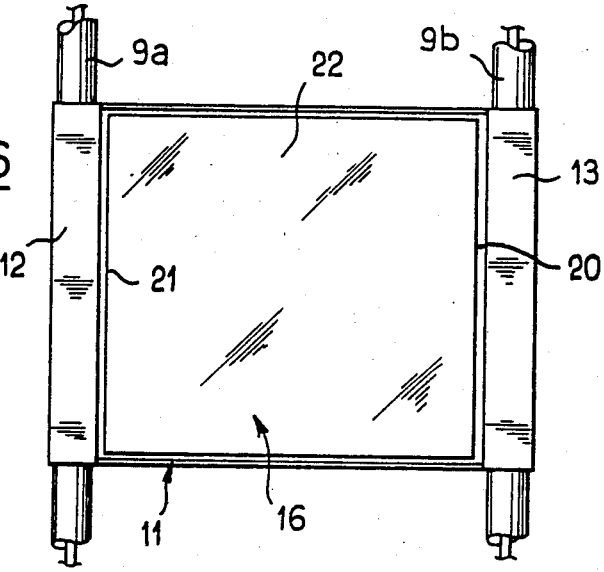
FIG. 6 is a top view of the device shown in FIG. 5.

Said oven has a tubular electric heating resistor 9 in the form of two legs 9a, 9b which are parallel to the bottom wall 10 of the oven. As shown in FIGS. 5 and 6, a water reservoir 11 of sheet metal is placed between the two legs 9a, 9b of said heating resistor 9.

To this end, said reservoir 11 has two flanges 12, 13 formed respectively on two opposite side walls 14, 15 of said reservoir. The flanges 12, 13 respectively are adapted to cover each of the two parallel legs 9a, 9b of the heating resistor 9. The reservoir 11 is closed by a cover 16 which is also formed of thin sheet metal and has side walls 17, 18 located in closely spaced relation to the side walls 14, 15 of the reservoir 11 and immersed in the water of said reservoir, thus forming an intermediate capillary space 19 which opens to the exterior through a slit 20 formed between the two flanges 12, 13 and the adjacent edge 21 of the top wall 22 of the cover 16.

Furthermore, the reservoir 11 is engaged within an opening 23 formed in the bottom wall 10 of the oven, with the result that the bottom wall 24 of the reservoir 11 is in contact with the exterior of the oven or the reservoir 11 is in contact with the external wall of said oven (see dashed line in FIG. 5).

The operation of this device is identical with the operation of the device shown in FIGS. 1 and 2.

When the resistor 9 is in the hot state, the water which has risen within the capillary space 19 vaporizes and escapes through the slits 20 placed along the resistor legs 9a, 9b.

The steam discharged through the slits is superheated to a temperature within the range of 160° C. to 200° C., depending on the distance between the heating element and the level of the water contained in the reservoir.

The water contained in the reservoir 11 is not liable to boil since the heat generated by the resistor 9 is not directly transmitted to the water contained in the reservoir. Furthermore, this water is cooled by the bottom wall 24 of the reservoir which is in contact with the exterior of the oven.

The present Applicant has shown that aromatic substances (herbs or alcohols) could be added to the water contained in the reservoir 11, thus having the effect of scenting the steam produced by the device without affecting its operation.

The device in accordance with the invention offers a further advantage in that it is very simple to construct, that it can readily be cleaned and can be removed from the oven and replaced with great ease.

Figure 7:
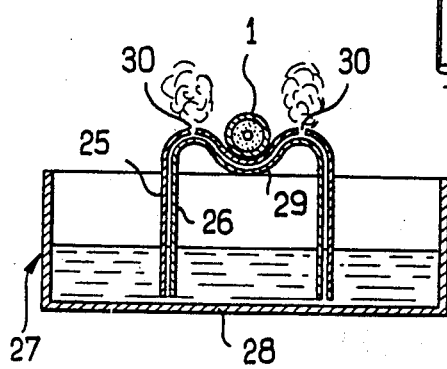
FIG. 7 is a view which is similar to FIGS. 1 and 5 and relates to an alternative embodiment.
Figure 8:
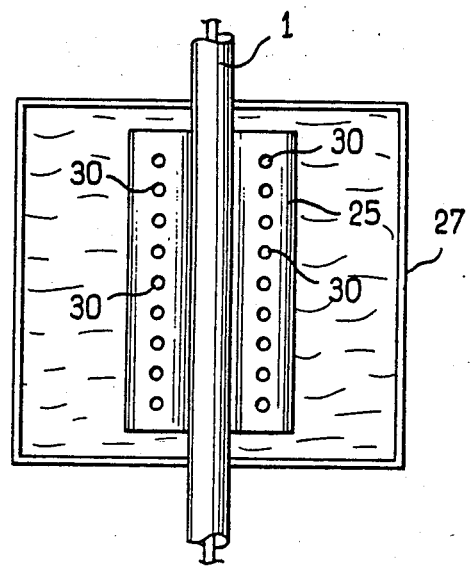
FIG. 8 is a top view of the device shown in FIG. 7.

In the alternative embodiment illustrated in FIGS. 7 and 8, the steam-generating device also comprises two sheet-metal members 25, 26 bent to a U-shaped cross-section and located in closely spaced relation to each other. The side walls of said sheet-metal members 25, 26 dip into the water 3 of the reservoir 27 and the lower ends of said side walls are in contact with the bottom reservoir wall 28 which serves as a support for said sheet-metal members.

The base of the U formed by the sheet-metal members 25, 26 has a channel portion 29 which is directed towards the bottom wall 28 of the reservoir 27 and partly follows the contour of the heating resistor 1. Two series of openings 30 are formed in the outer sheet-metal member 25 along two lines parallel to the resistor 1 and located on each side of the channel portion 29.

The operation of the device just described is identical with the operation of the preceding embodiments.

As will be readily apparent, the invention is not limited to the examples of construction described in the foregoing and any number of modifications may accordingly be contemplated without thereby departing from the scope or the spirit of the invention.

Thus the sheet-metal member employed for constructing the device in accordance with the invention can be of a metal or alloy other than stainless steel on condition that the material employed affords resistance to the prolonged action of high temperatures, of water and of steam and that its thermal conductivity is neither too high nor too low. The surface state of the metal may also be modified by a suitable treatment (sanding or burnishing, for example) in order to vary the rate of flow of water.

It will be understood that the potential applications of the steam-generating device in accordance with the invention are not limited to ovens but extend to other fields such as steam-producing appliances for facial care or ambient-air humidifiers and the like.

The space formed between the two sheet-metal members can be adjusted with accuracy by placing shims of small thickness between said sheet-metal members or by forming wavy corrugations of small amplitude on one of said members.

Figure 9:
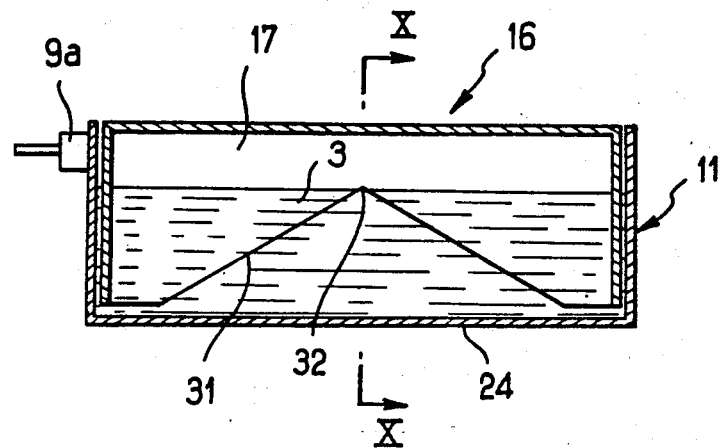
FIG. 9 is a longitudinal sectional view which is perpendicular to the view of FIG. 5 and shows an alternative embodiment.
Figure 10:
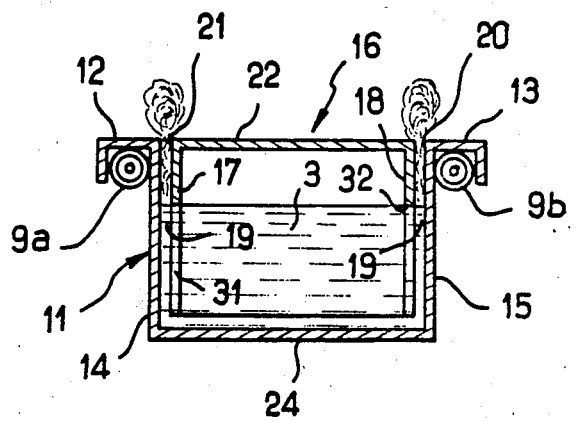
FIG. 10 is a sectional view taken along the plane X—X of FIG. 9.

Furthermore, in the device shown in FIGS. 9 and 10, means are provided for varying the rate of steam delivery between the beginning and end of the cooking process, that is, between the moment when the vessel 11 is full and the moment when this latter is nearly empty. To this end, there is formed in the side walls 17, 18 a recessed portion 31 having the shape of an inverted V or in other words downwardly flared, the summit 32 of said recessed portion 31 being located near the maximum level of the water contained in the reservoir 31. It is observed that, by virtue of said recessed portion 31, the flow rate of steam delivered at 20 and 21 is of maximum value at the start of the cooking process, then decreases progressively as the water level drops within the vessel. It is thus possible to program the rate of steam delivery as a function of the cooking time.

As will be readily apparent, the recessed portion mentioned in the foregoing could also be formed on the walls 26 of the device shown in the alternative embodiment of FIG. 7.

What is claimed is:

1. A steam generator for an electric oven for food cooking, comprising a tubular electric heating resistor (9) having two legs (9a, 9b) which are parallel to the bottom wall (10) of the oven, wherein a sheet-metal water reservoir (11) is placed between the two legs (9a, 9b) of said heating resistor (9), said reservoir being provided with two flanges (12, 13) formed respectively on two opposite side walls (14, 15) of said reservoir, said flanges (12, 13) being adapted to cover each of the two legs (9a, 9b) of the heating resistor, said reservoir being closed by a sheet-metal cover (16) engaged within said reservoir and provided with side walls (17, 18) which are located in closely spaced relation to the side walls (14, 15) of the reservoir (11) and dip into the water (3) of said reservoir so as to form between said side walls a capillary space (19) which opens outwards in the zone (20) located between the two flanges (12, 13) and the edge (21) of the top wall (22) of the cover (16).

2. A steam generator according to claim 1, wherein the sheet-metal members (17, 18 ; 26) have a downwardly-flared recessed portion (31).

3. A steam generator for an electric oven for cooking food, comprising inner and outer sheet-metal members (25, 26) which are bent to a U-shaped cross-section and located in closely spaced relation to each other, side walls of said sheet-metal members being immersed in water (3) in a reservoir (27) a channel portion (29) formed in a base of the U being directed towards a bottom wall (28) of the reservoir and adapted to follow the contour of a heating resistor (1), two series of openings (30) being formed in the outer sheet-metal member (25) along two lines parallel to said resistor (1) and located on each side of said channel portion (29).

* * * * *